US011510516B2

(12) United States Patent
O'Brien

(10) Patent No.: US 11,510,516 B2
(45) Date of Patent: Nov. 29, 2022

(54) ADJUSTABLE MAILBOX POST JOINT

(71) Applicant: Thomas L. O'Brien, Cohoes, NY (US)

(72) Inventor: Thomas L. O'Brien, Cohoes, NY (US)

( * ) Notice: Subject to any disclaimer, the term of this patent is extended or adjusted under 35 U.S.C. 154(b) by 79 days.

(21) Appl. No.: 17/194,556

(22) Filed: Mar. 8, 2021

(65) Prior Publication Data
US 2022/0279952 A1 Sep. 8, 2022

(51) Int. Cl.
*A47G 29/12* (2006.01)
*F16D 3/16* (2006.01)

(52) U.S. Cl.
CPC ........... *A47G 29/1216* (2013.01); *F16D 3/16* (2013.01)

(58) Field of Classification Search
CPC . A47G 29/1216; F16M 11/14; F16C 11/0661; F16D 3/16
USPC ........................ 232/39; 248/181.1; 403/143
See application file for complete search history.

(56) References Cited

U.S. PATENT DOCUMENTS

| | | | | |
|---|---|---|---|---|
| 903,242 A * | 11/1908 | Thayer | ............... | A47G 29/1216 248/128 |
| 2,050,280 A * | 8/1936 | Dean | .................. | A47G 29/1216 248/145 |
| 3,204,898 A * | 9/1965 | Manning | ................. | B63B 17/04 411/959 |
| 4,273,461 A | 6/1981 | Kjellstrand | | |
| 5,404,682 A * | 4/1995 | West | ....................... | E01F 9/642 52/114 |
| 5,458,428 A * | 10/1995 | West | ......................... | E04C 3/30 403/252 |
| 6,273,390 B1 | 8/2001 | Meyer | | |
| 6,513,774 B2 | 2/2003 | Hailson | | |
| 7,108,445 B2 * | 9/2006 | Henriques | .......... | A47G 29/1216 403/291 |
| 7,669,341 B1 * | 3/2010 | Carazo | ................... | G01C 15/02 248/474 |
| 7,992,767 B1 * | 8/2011 | Holmes | ............... | A47G 29/1216 248/219.2 |
| 9,924,821 B1 * | 3/2018 | Shamas | ............... | A47G 29/1216 |
| 10,156,076 B1 | 12/2018 | Tiggelen | | |
| 2003/0129019 A1 * | 7/2003 | Callaway | ........... | F16M 11/2078 403/120 |
| 2004/0228677 A1 * | 11/2004 | Henriques | .......... | A47G 29/1216 403/229 |
| 2005/0218273 A1 * | 10/2005 | Huang | ................... | F16M 13/02 248/126 |
| 2010/0004064 A1 * | 1/2010 | Hu | ........................... | F16D 3/20 464/112 |
| 2010/0237143 A1 * | 9/2010 | LaBrecque, Jr. | .. | A47G 29/1216 232/39 |
| 2011/0182654 A1 * | 7/2011 | Hu | ........................... | F16D 3/16 403/123 |
| 2014/0021311 A1 * | 1/2014 | Lenz, Jr. | ............. | A47G 29/1216 248/156 |
| 2021/0388630 A1 * | 12/2021 | Howells | .............. | F16C 11/0661 |

* cited by examiner

*Primary Examiner* — William L Miller
(74) *Attorney, Agent, or Firm* — Lee Palmateer; Lee Palmateer Law Office LLC

(57) ABSTRACT

The present invention is directed to an improved ball and socket joint for connecting two mailbox post segments together, and improved mailbox post comprising a ball and socket joint, and a method for repairing a leaning mailbox post.

9 Claims, 21 Drawing Sheets

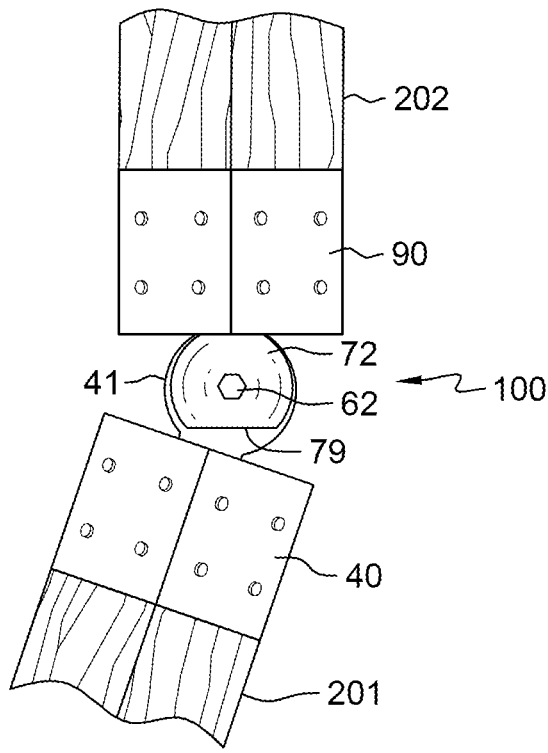
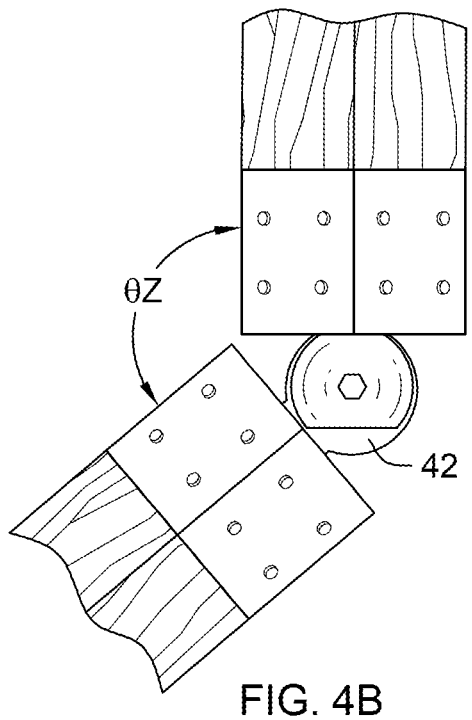
FIG. 4A
FIG. 4B
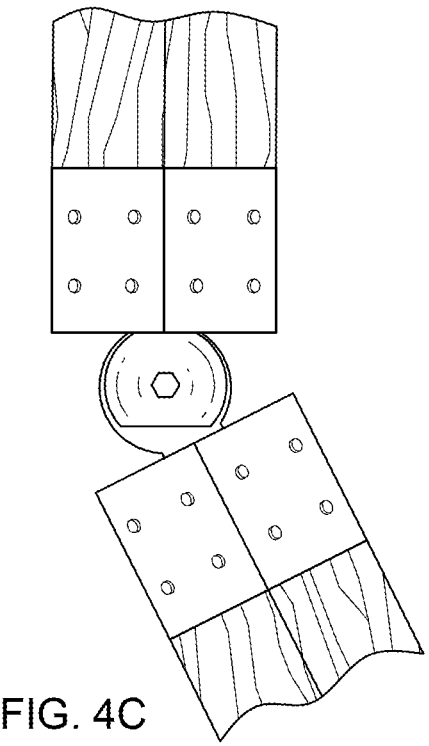
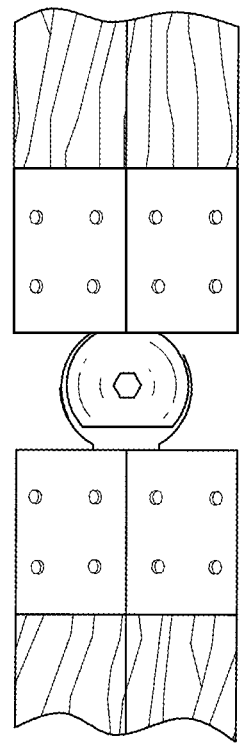
FIG. 4C
FIG. 4D

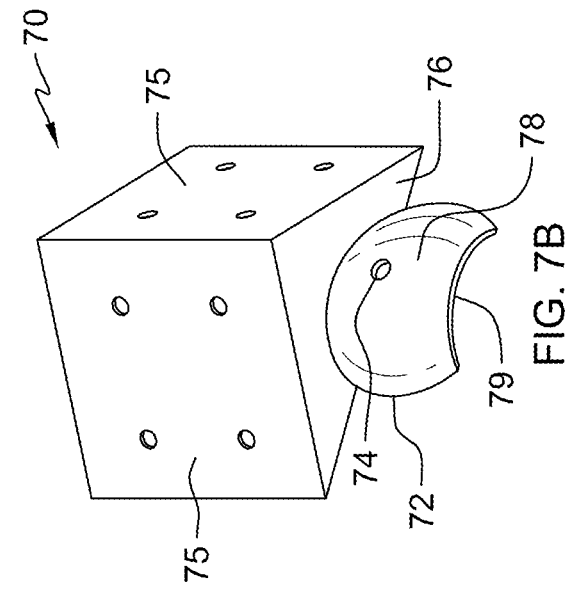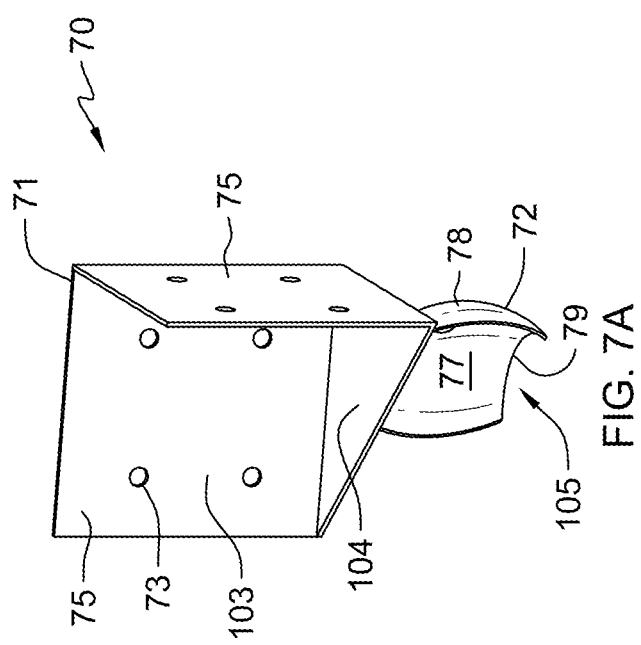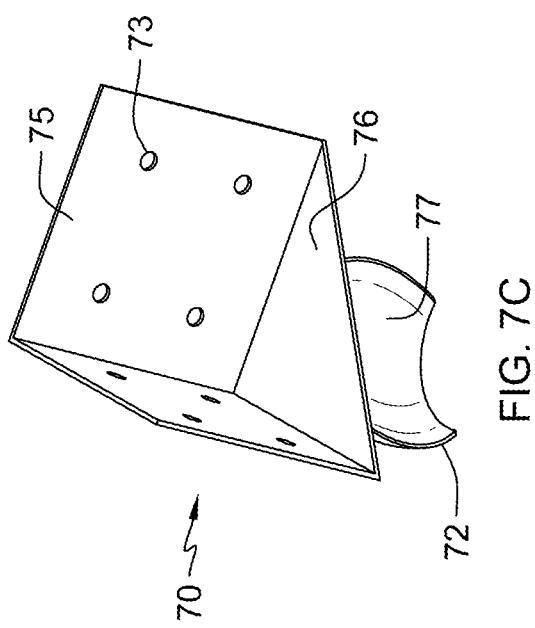

ADJUSTABLE MAILBOX POST JOINT

TECHNICAL FIELD

The present invention relates to a joint for adjustably joining two mailbox post segments together and a method for repairing a leaning mailbox post.

BACKGROUND OF THE INVENTION

Mailboxes are typically mounted horizontally on vertical posts. A vertical post and horizontal mailbox are desirable for ease of installation, safety, stability, durability, aesthetics and for functionality of the mailbox. Mailboxes are designed to function best when the bottom of the mailbox is horizontal. Therefore, it is important to maintain the mailbox post in a vertical orientation so that the mailbox remains in a horizontal orientation.

According to United States Postal Service (USPS) guidelines, the best curbside mailbox supports are stable but bend or fall away if hit by a car. The Federal Highway Administration (FHA) also recommends that mailbox posts should not be unyielding and that posts should be buried no more than 24" deep in the ground. Such laudable emphasis on safety may admit for a higher incidence of posts losing verticality over time.

A post may lose vertical alignment by various causes such as by a lateral force of an object hitting the post or by movement of the ground in which the post is erected. To restore a leaning post to vertical, one typically would adjust, repair or replace the base of the post to reestablish verticality of the entire post. Such a repair may require significant time, effort, expense, skills, tools, and materials that people do not have or wish to expend.

There is a need for better way to adjust the alignment of a post without having to adjust the base of the post.

The present invention is directed to an improved means for adjusting the orientation of the upper elevations of a post without having to adjust the orientation of the lower elevations of the post.

The present invention is directed to an improved joint for adjustably connecting two post segments together. The adjustable joint of the present invention allows one to adjust the orientation of upper elevations of a misaligned post without adjusting the orientation of the base of the post. Instead of adjusting the base of the post, one may sever the post into two segments then reconnect the base segment with the upper segment with the adjustable joint. The joint may be manipulated to adjust the orientation of the upper segment without having to adjust the orientation of the base segment. Once the upper segment is in its desired orientation, the joint may be releasably tightened to releasably fix it in that orientation. Thus, there is no need to repair, replace or adjust the foundation of the post.

If there is further movement of the base after the initial repair, or if the upper post segment otherwise needs to be re-oriented, the joint may be loosened, re-adjusted and re-tightened to releasably fix the upper post segment in the desired new orientation.

A new post may be provided with an adjustable joint of the present invention in anticipation of future misalignment so that the post may be realigned with a simple adjustment of the joint. The adjustable joint may be integral to an uninstalled new post.

SUMMARY OF THE INVENTION

In a first aspect, the present invention provides an adjustable mailbox post joint comprising a first post adapter having a first body comprising a first interface surface for aligning a first extension in a longitudinal direction from the end of a first post segment; a first extension extending longitudinally from said first body, said first extension comprising a convex surface; a second post adapter having a second body comprising a second interface surface for aligning a second extension in a longitudinal direction from the end of a second post segment; a second extension extending longitudinally from said second body, said second extension comprising concave surface; a first peripheral surface defining a first lateral-facing opening through said convex surface for receiving a connecting member; a second peripheral surface defining a second lateral-facing opening through said concave surface for receiving a connecting member; a connector member comprising a shaft having a shaft axis and shaft surface; said connector member disposed through the first and second openings so that said peripheral surfaces and shaft surface provide mechanical constraint to prevent said first post adapter from longitudinal separation from said second post adapter; said first post adapter and second post adapter connected rotatably about the shaft axis with the concave surface facing the convex surface.

In a second aspect, the present invention provides a mailbox post comprising a first post segment extending a length in a first longitudinal direction; a second post segment connected to the first post segment by an adjustable joint and extending a length in a second longitudinal direction; the adjustable joint comprising a convex surface, a concave surface slidably engageable with said convex surface, a first lateral-facing opening through said convex surface for receiving a connecting member, a second lateral-facing opening through said concave surface for receiving the connecting member; and the connector member comprising a shaft disposed through the first and second openings transversely to the first longitudinal direction; said convex surface and concave surface connected rotatably about the connector member with the concave surface facing the convex surface; and the second longitudinal direction adjustable by rotating the second post segment relative to the first post segment about an axis of the connector member In a third aspect, the present invention provides an adjustable mailbox post joint kit comprising a first post adapter having a first body comprising a first interface surface for aligning a first extension in a longitudinal direction from the end of a first post segment; a first extension extending longitudinally from said first body, said first extension comprising a convex surface and a lateral-facing opening through said convex surface; a second post adapter having a second body comprising a second interface surface for aligning a second extension in a longitudinal direction from the end of a second post segment; a second extension extending longitudinally from said second body, said second extension comprising concave surface and a lateral-facing opening through said concave surface; said concave surface forming a hollow for receiving the convex surface; and a connector member comprising a shaft for insertion through the first and second openings to connect said first post adapter and second post adapter rotatably about the connector member shaft In a fourth aspect, the present invention provides a method of repairing a leaning post, comprising the steps of severing the post transversely to a longitudinal axis into a first post segment and second post segment; providing a first post adapter comprising a longitudinally extending first extension having a convex surface and a first lateral-facing opening through said convex surface; attaching the first post adapter to the first post segment so that said first lateral-facing opening faces laterally; providing a second post comprising a longitudinally extending second extension having a concave surface and a second lateral-facing opening through said concave surface; attaching the second post adapter to the second post segment so that said second lateral-facing opening faces laterally; aligning the first and second lateral-facing openings so that the concave surface faces the convex surface; inserting a connector member comprising a shaft through the first and second lateral-facing openings so as to connect the first and second post adapters together rotatably about an axis of the shaft; rotating the second post adapter to a desired position in relation to the first post adapter; and releasably tightening the fastener to releasably fix the first post adapter in place in relation to the second post adapter.

BRIEF DESCRIPTION OF THE DRAWINGS

The subject matter that is regarded as the invention is particularly pointed out and distinctly claimed in the concluding portion of the specification. The invention, however, may be best understood by reference to the following detailed description of various embodiments and the accompanying drawings in which:

FIG. 4A is a close-up side view of the adjustable joint of FIG. 3;

FIG. 4B is a side view of the adjustable joint with the lower post segment leaning at a different angle than in FIG. 4A;

FIG. 4C is a side view of the adjustable joint with the lower post segment leaning at a different angle than in FIGS. 4A and 4B;

FIG. 4D is a side view of the adjustable joint with the lower and upper post segments aligned vertically;

FIG. 7A is an isometric view from above of a socket adapter of the adjustable joint shown in FIG. 5;

FIG. 7B is an isometric view from below of the socket adapter of FIG. 7A showing the outside corner;

FIG. 7C is another isometric view from above of the socket adapter of FIG. 7A showing the inside corner;

DETAILED DESCRIPTION OF THE INVENTION

Figure 1A:
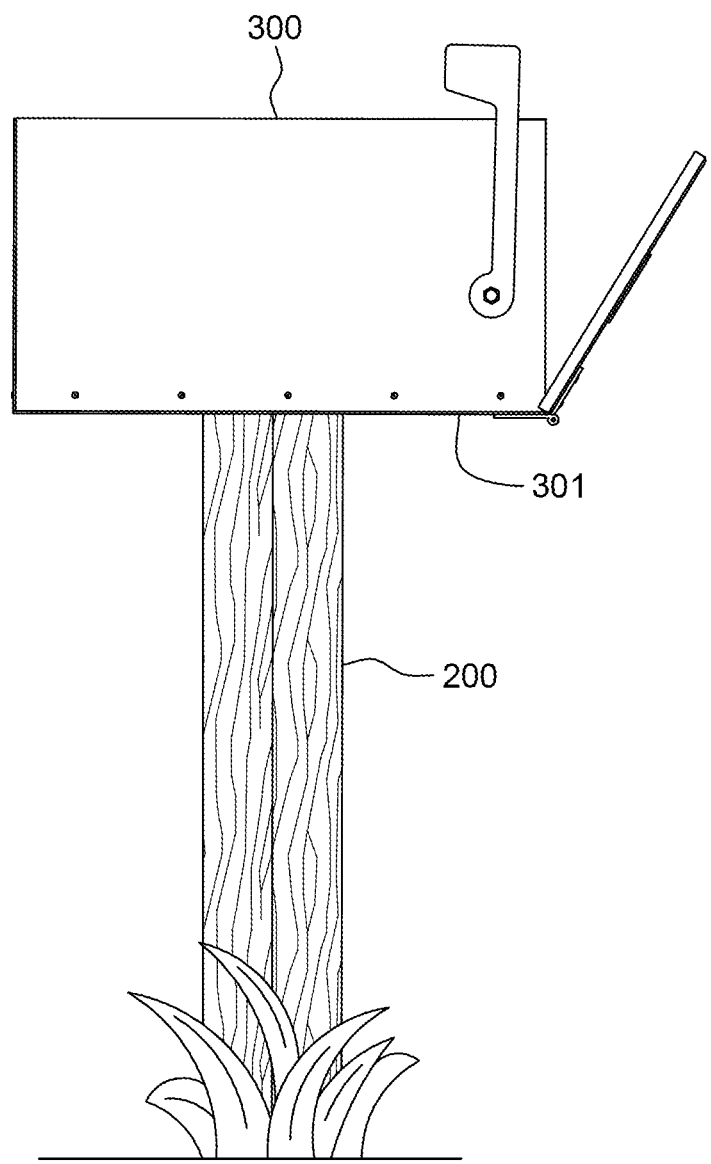
FIG. 1A is a side view of a horizontal mailbox attached to a vertical mailbox post installed in the ground.

With reference to FIG. 1a, horizontally oriented mailbox 300 is fixedly mounted on vertical post 200 which is in the ground. Post 200 may comprise a straight length in a longitudinal direction having a longitudinal axis and a uniform cross section that is symmetrical about the longitudinal axis. Bottom 301 of the mailbox is perpendicular to the longitudinal axis of the post.

The bottom of Post 200 may be buried below-ground, for example approximately two feet or less below. The bottom 301 of the mailbox is flat and horizontally disposed a height above the ground, for example approximately 44" above ground. Post 200 may comprise a wooden post of uniform 4"×4" square cross section and sufficient length to allow the bottom to be buried up to two feet underground and the top to extend at least 40" above ground. For example, the post may be between about 64" to 70" long.

The adjustable joint of the of the present invention may be adapted to any post size, shape or material.

Figure 1B:
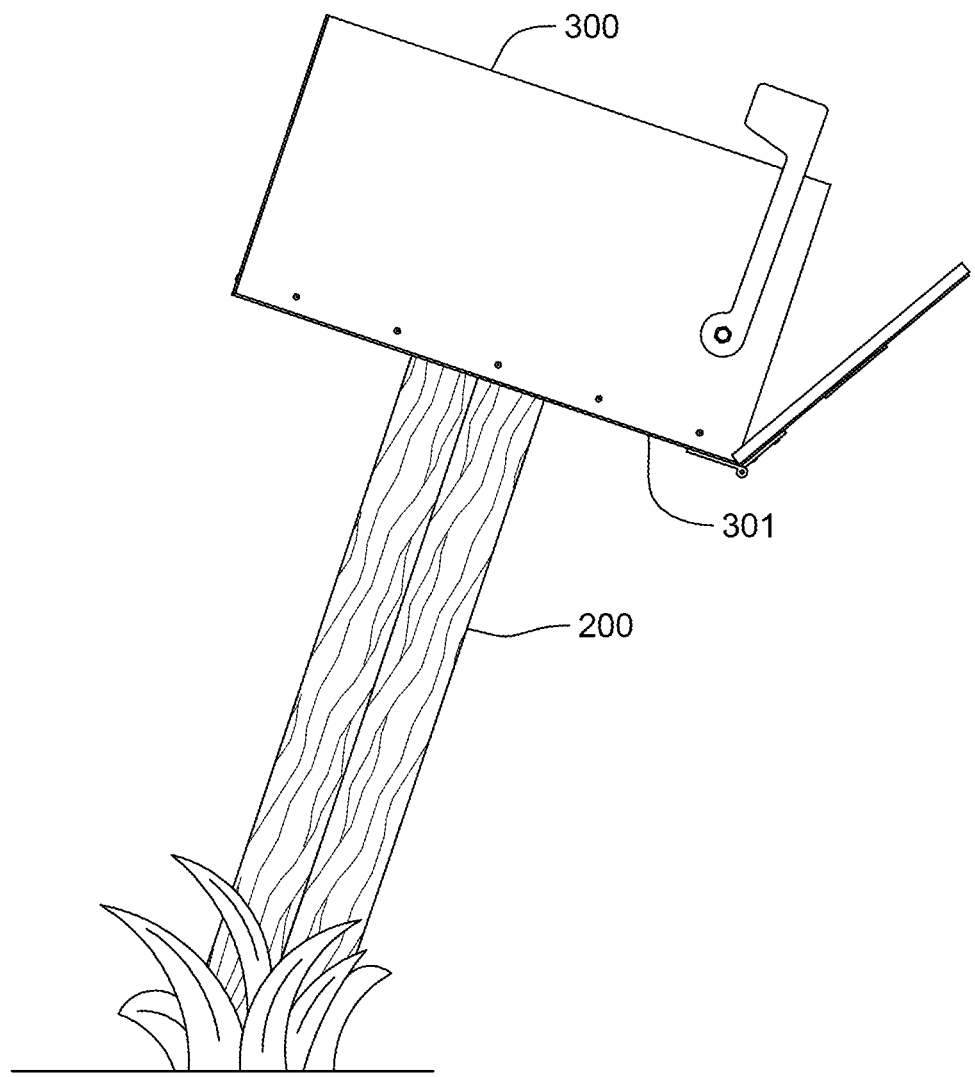
FIG. 1B is a side view of the mailbox and post of FIG. 1A, with the post leaning and the mailbox tilted.

With reference to FIG. 1B, mailbox bottom 301 is disposed perpendicularly to the longitudinal axis of the post. Post 200 is leaning away from vertical and mailbox 300 is correspondingly tilted way from horizontal.

Figure 2:
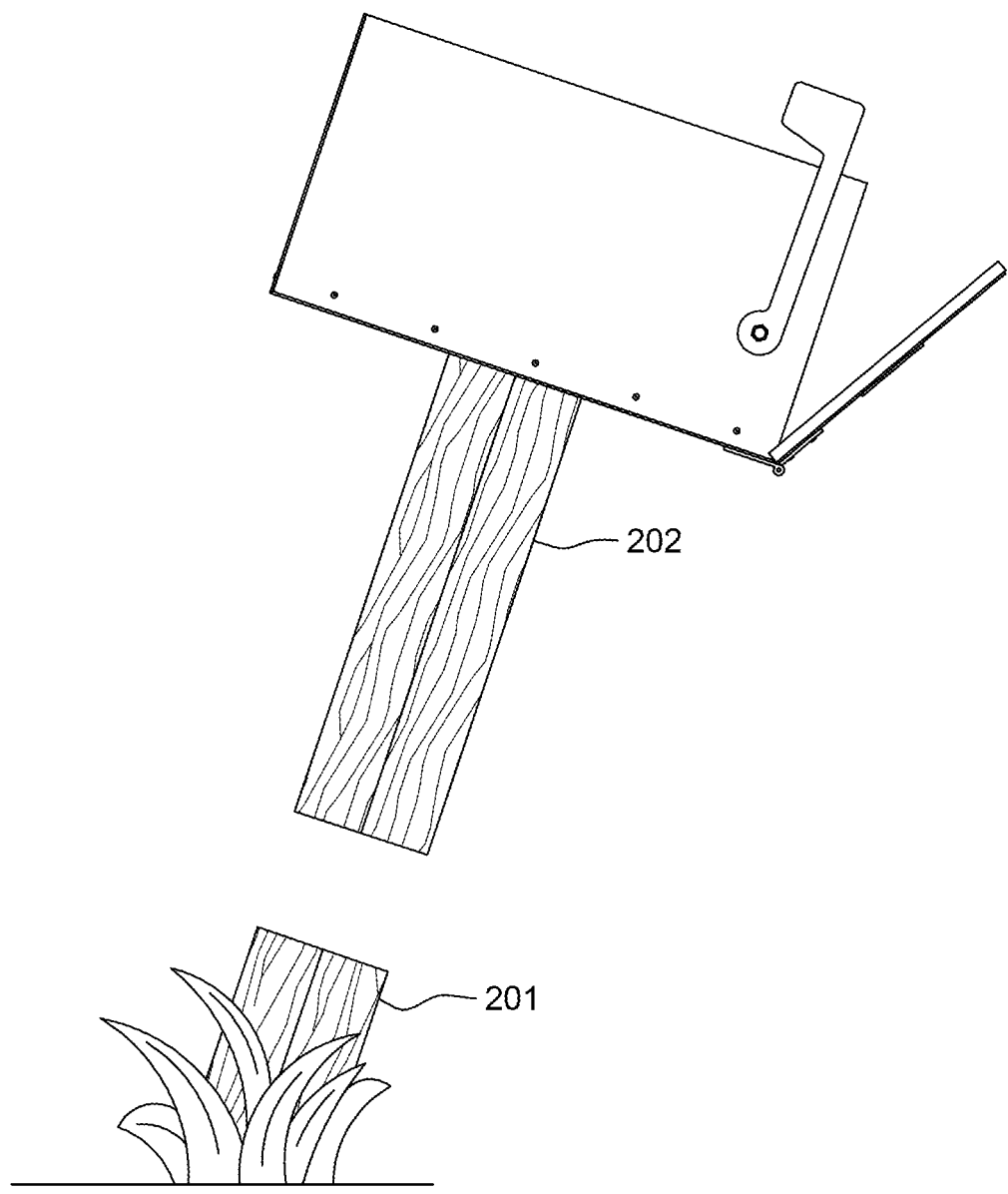
FIG. 2 is a side view of the post and mailbox of FIG. 1B with the post severed into two segments.
Figure 3:
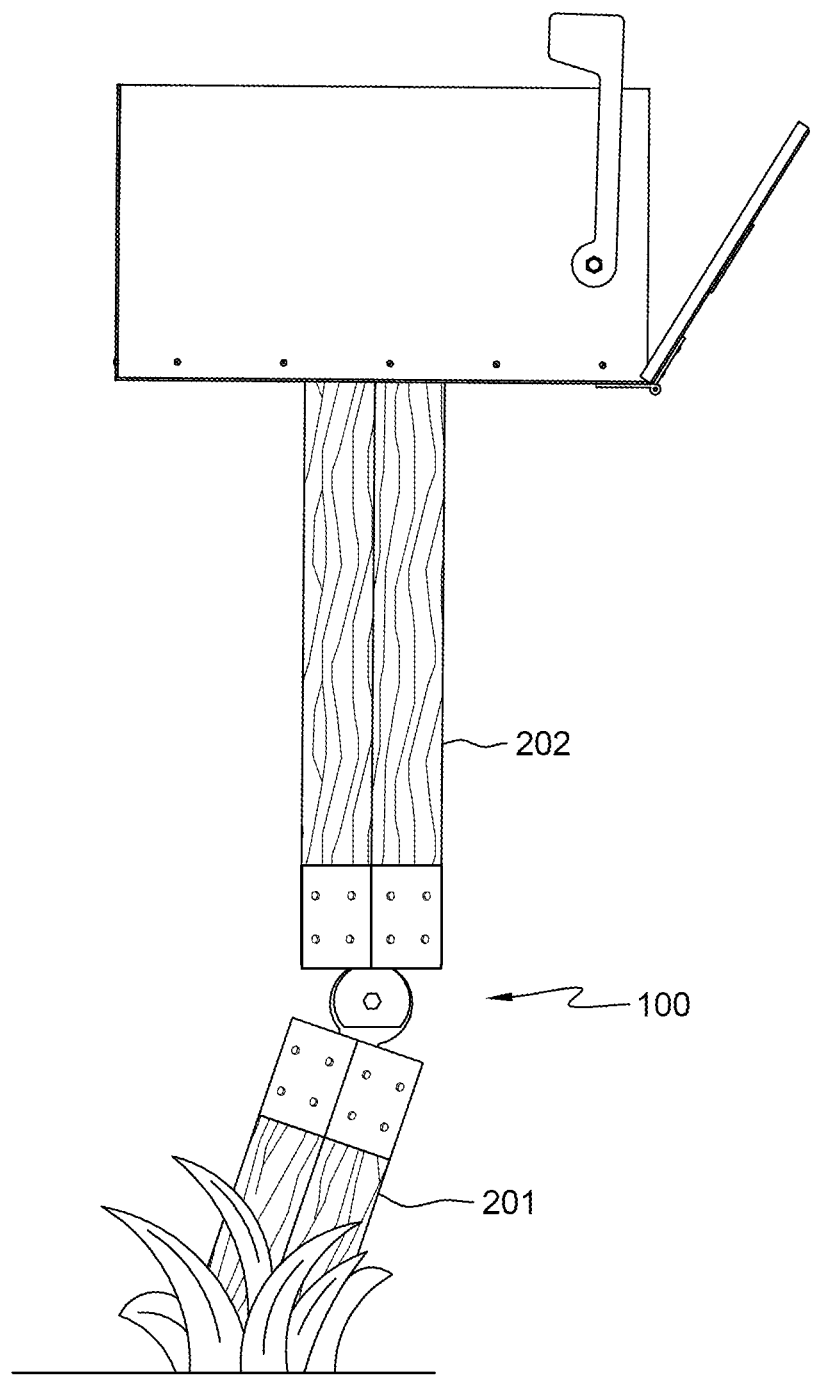
FIG. 3 is side view of the mailbox and post of FIG. 2 with the post segments connected with the adjustable joint of the present invention and the upper post segment restored to vertical.

With reference to FIGS. 2 and 3, a leaning mailbox can be repaired by severing post 200 transversely to its longitudinal axis into post segments 201 and 202 and connecting the two segments with adjustable joint 100 of the present invention. The joint may be adjusted so that segment 202 is restored to vertical while segment 201 remains leaning. The joint may be releasably tightened to releasably fix it at the desired adjustment.

With reference to FIGS. 4A through 4D, joint 100 may be variably adjustable to any position through a range of angles as necessary to achieve the desired orientation of post segment 202 relative to the orientation of post segment 201. Four different orientations are shown for example in FIGS. 4A through 4D.

With further reference to FIG. 3, FIGS. 4A through 4D, and FIG. 5, joint 100 comprises ball adapter 40 and socket adapter pair 90. Ball adapter 40 is attached to post segment 201 and socket adapter pair 90 is attached to post segment 202. The ball adapter is provided with holes 45 (see FIG. 5) and socket adapter with holes 73 and 83 (see FIG. 5) for receiving fasteners such as nails and screws (not shown) for attaching the adapters to the post segments. The ball adapter may be rotatably connected to the socket adapter.

Ball adapter 40 may be attached to the end portion of a post segment to adapt the post for fitting with a socket adapter 70, socket adapter 80 or socket adapter pair 90 attached to another post. Ball adapter 40 is attached to post segment 201 and socket adapter pair 90 is attached to post segment 202. The ball adapter is provided with holes 45 (see FIG. 5) and socket adapter with holes 73 and 83 (see FIG. 5) for receiving fasteners such as nails and screws (not shown) for attaching the adapters to the post segments. The ball adapter may be rotatably connected to the socket adapter.

Figure 5:
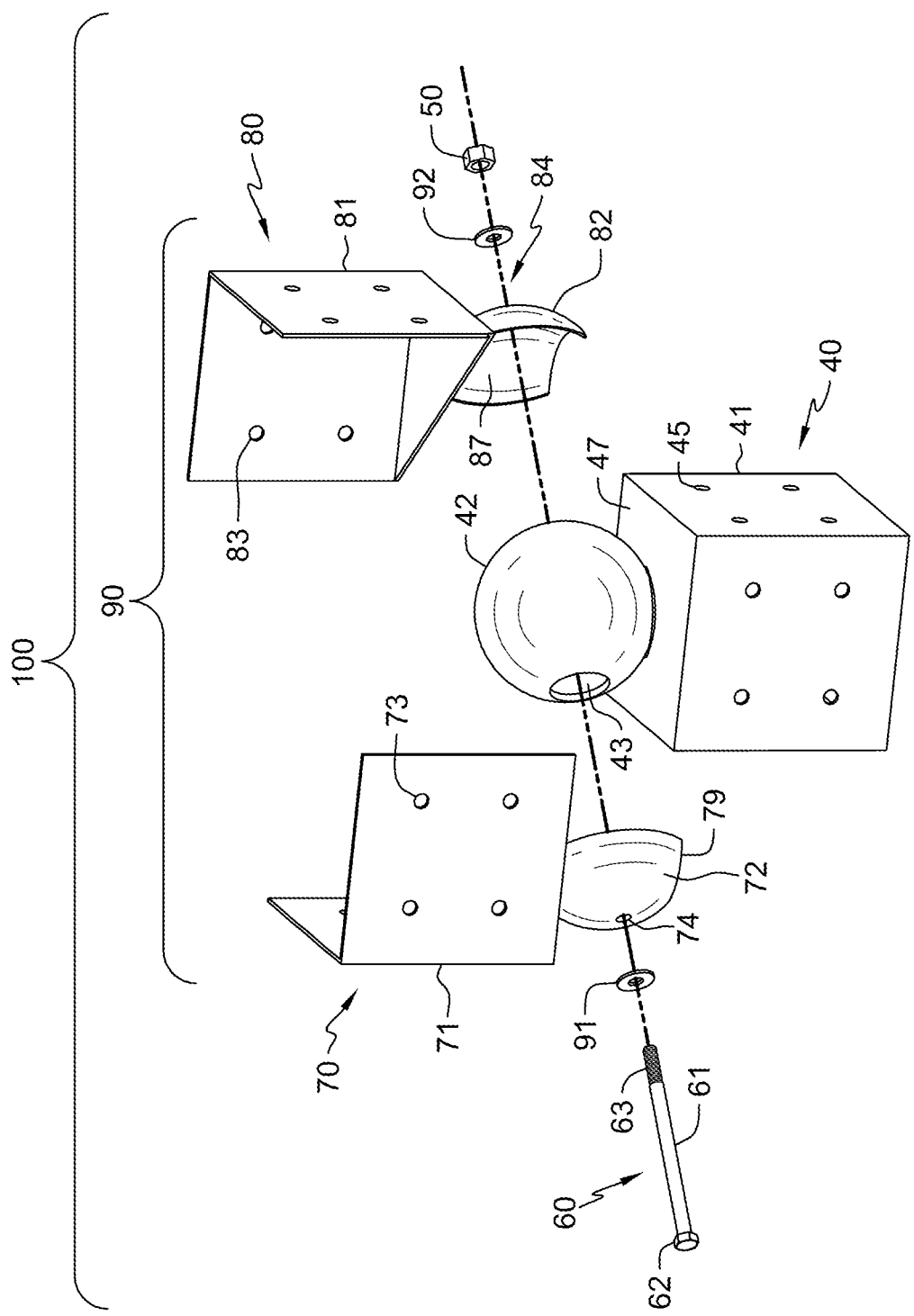
FIG. 5 is an exploded assembly view of the adjustable joint of FIG. 3.
Figure 8:
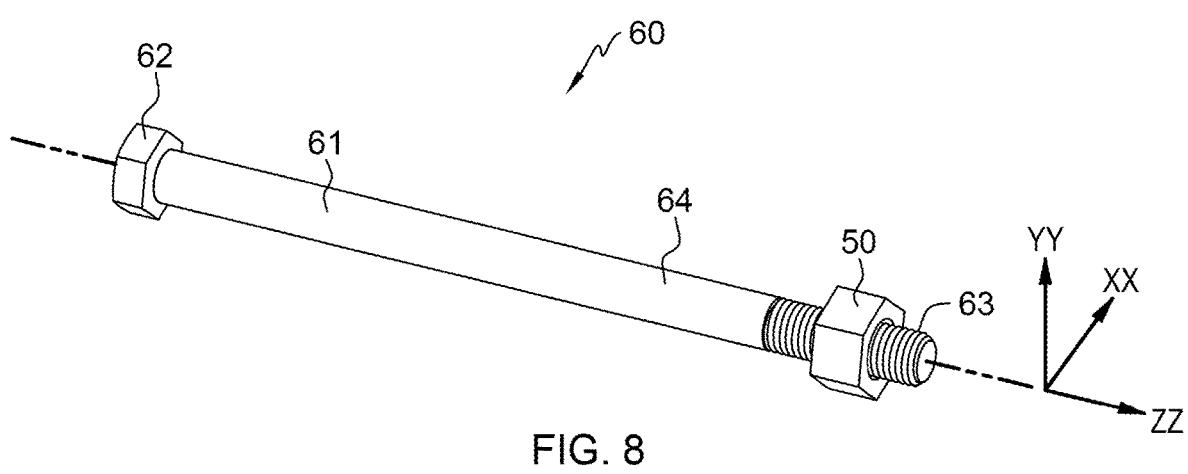
FIG. 8 is an isometric view of the bolt and nut of the adjustable joint shown in FIG. 5.

With reference to FIGS. 5 and 8, joint 100 further comprises joint connector 60 for adjustably and releasably connecting the ball adapter to the socket adapter. Joint connector 60 may comprise a threaded fastener. The threaded fastener may comprise nut 50 and bolt 60 having a shaft 61, head 62 and threads 63. In a preferred embodiment, shaft 61 has a ⅜-inch diameter. With further reference to FIG. 8, threaded fastener 60 has a longitudinal axis ZZ. Axes YY and XX are axes perpendicular to longitudinal axis ZZ and perpendicular to each other.

With reference to FIGS. 5, 6A-6D, and 13A-13D, in a preferred embodiment, ball adapter 40 comprises adapter body 41 for connecting the ball adapter to a post segment and extension 42 extending longitudinally upwardly from body 41 for insertion into the socket of the socket adapter to form an adjustable ball and socket joint.

In a preferred embodiment, adapter body 41 may comprise a bottomless box formed by four sides 46 and top 47, said four sides and top forming cavity 44 for receiving an end portion of a post segment. In a preferred embodiment, sides 46 form a square cavity for receiving a 4"×4" square post. Sides 46 may comprise post interface surface 101 and top 47 may comprise post interface surface 102, said interface surfaces for engaging with a surface of a post segment. In a preferred embodiment, sides 46 and top 47 may comprise 10-gauge galvanized steel sheet and may be welded together. Extension 42 may comprise a rounded outer surface 106. In a preferred embodiment, at least a portion of the outer surface comprises a spherical shape. The spherical shape may comprise a 3-inch diameter spherical segment ("spherical segment" defined herein to include any portion of a spherical surface up to an entire sphere).

The ball adapter may further comprise through-opening 43 extending laterally diametrically through the ball for receiving joint connector 60. In a preferred embodiment, opening 43 is round and may have a 1-inch diameter.

Figure 6B:
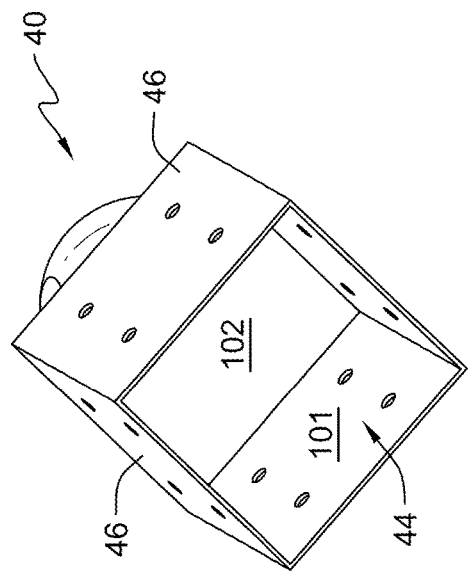
FIG. 6B is an isometric view from below of the ball adapter of FIG. 6A.
Figure 6D:
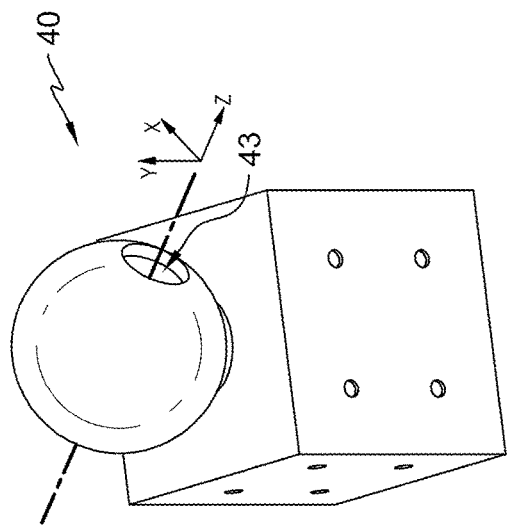
FIG. 6D is another isometric view from above of the ball adapter of FIG. 6A.
Figure 6A:
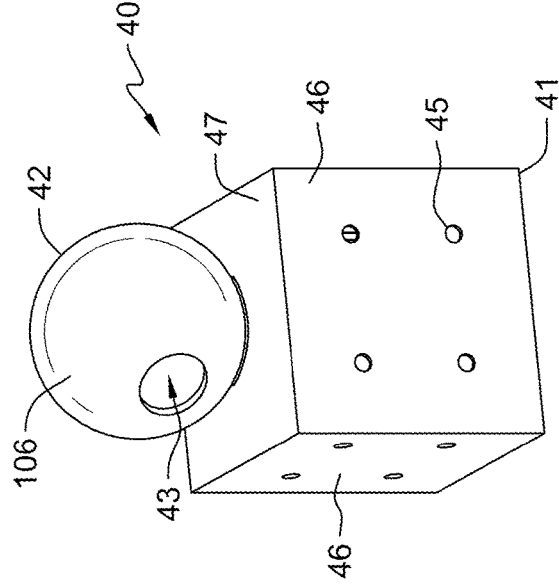
FIG. 6A is an isometric view from above of the ball adapter of the adjustable joint shown in FIG. 5.
Figure 6C:
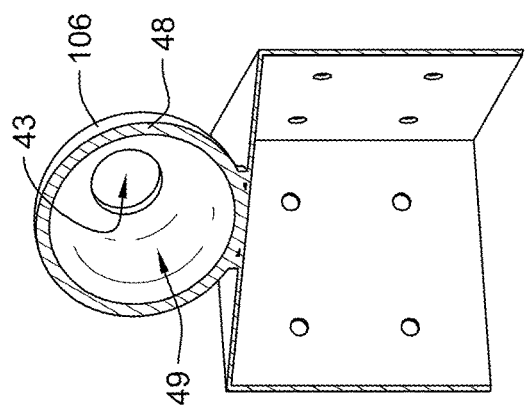
FIG. 6C is a cross-sectional isometric view of the ball adapter of FIG. 6A.
Figure 16A:
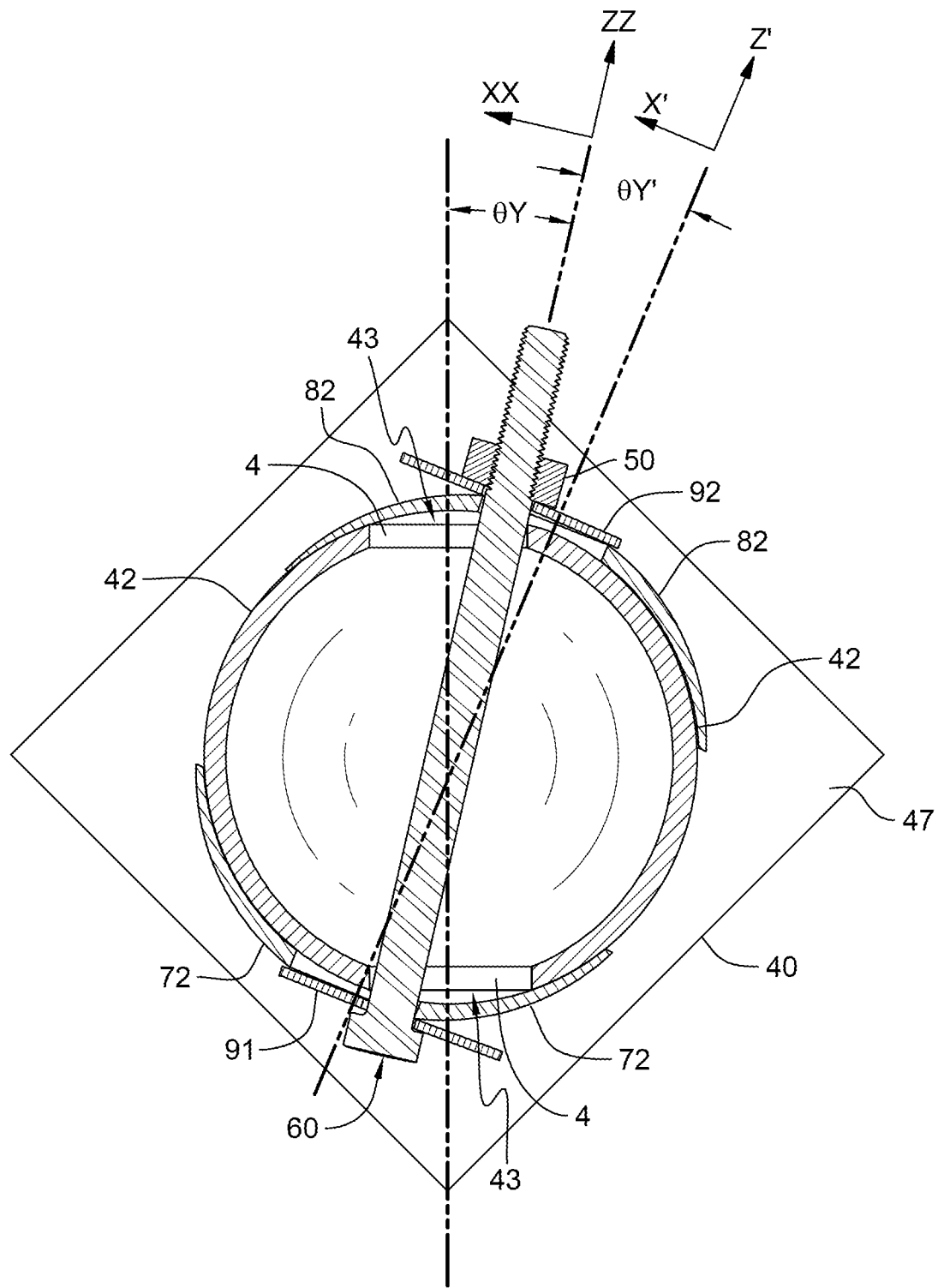
FIG. 16A is an alternate embodiment of the adjustable joint of FIG. 12B.
Figure 16B:
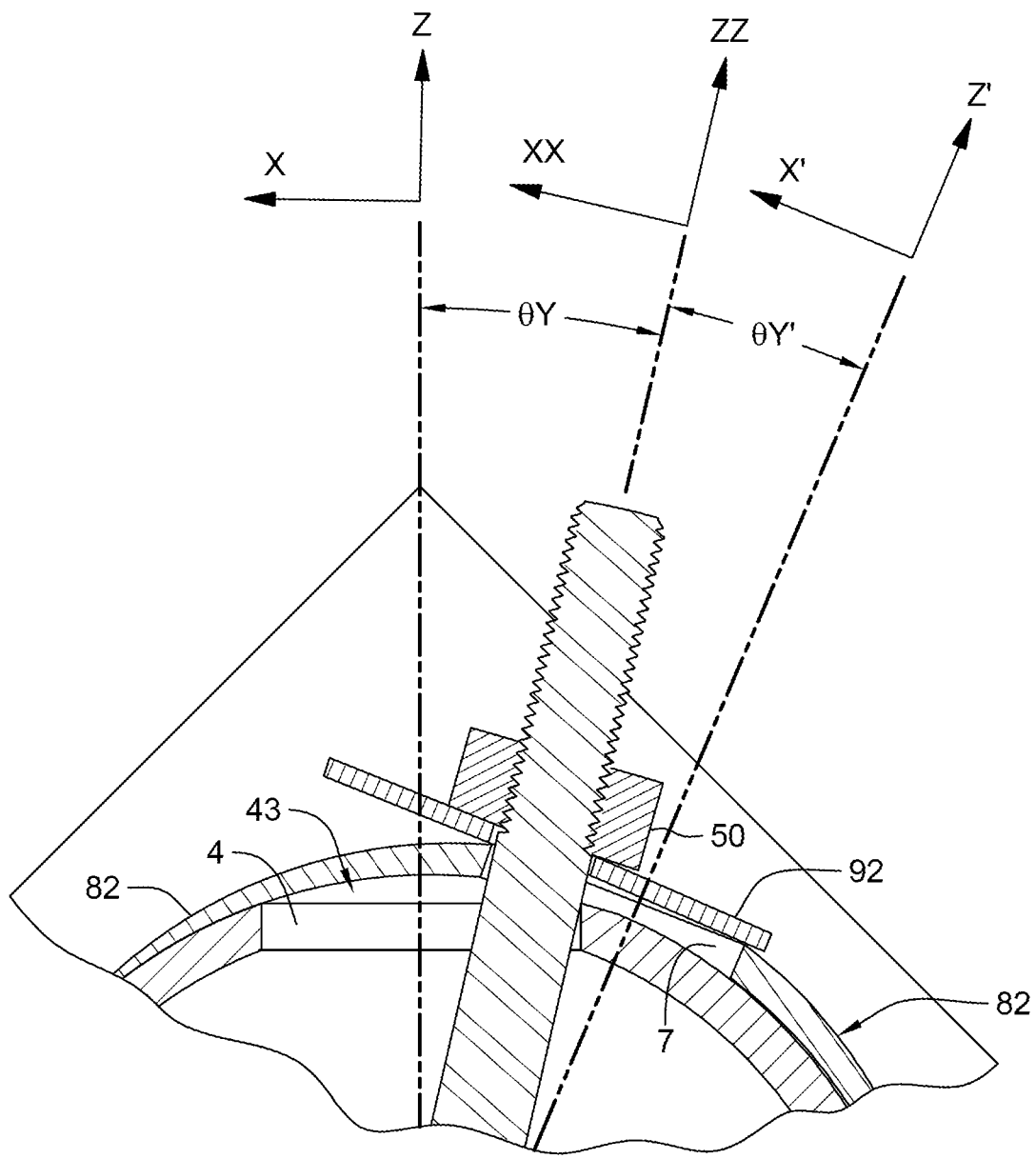
FIG. 16B is a close-up view of a portion of FIG. 12A.

With reference to FIGS. 6C and 13A-13D, in a preferred embodiment, extension 42 comprises convex surface 106 and wall 48 having thickness and forming a hollow interior cavity 49. In said embodiment, opening 43 comprises first opening 43 through the wall and second opening 43 through the wall aligned coaxially and diametrically across the ball laterally from said first opening. With reference to FIGS. 6D, 12B and 16B, openings 43 may be aligned on axis Z.

Figure 14A:
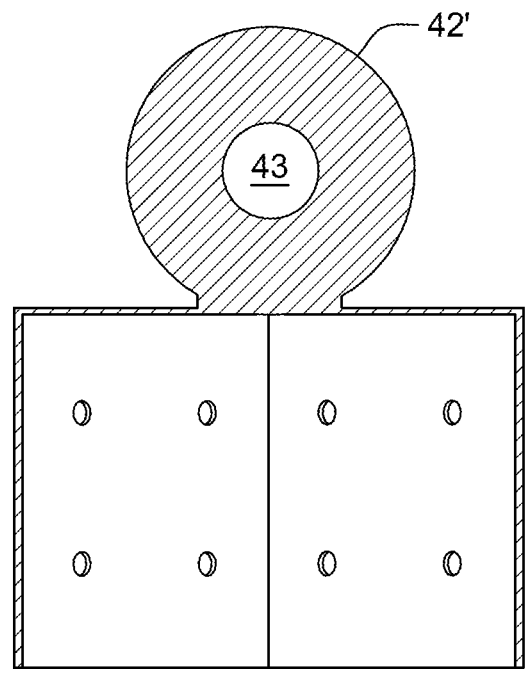
FIG. 14A is a cross-sectional view of a ball adapter as in FIG. 13C except having a solid ball and through hole.
Figure 14B:
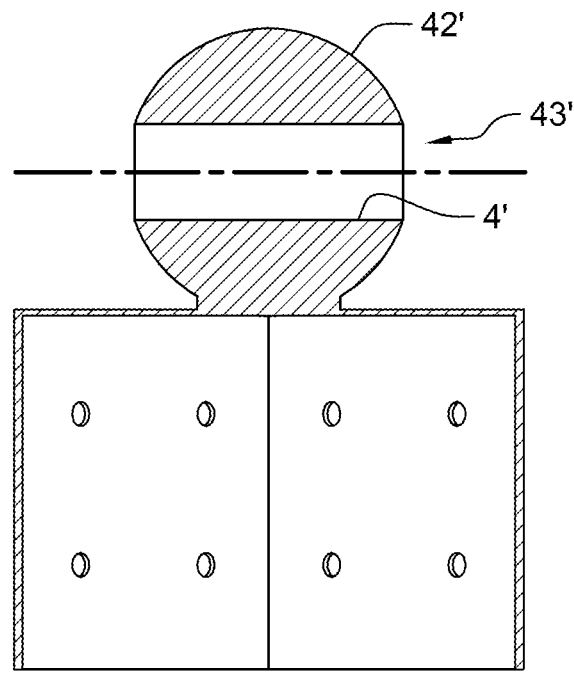
FIG. 14B is a cross-sectional view of a ball adapter as in FIG. 13D except having a solid ball and through hole.
Figure 15A:
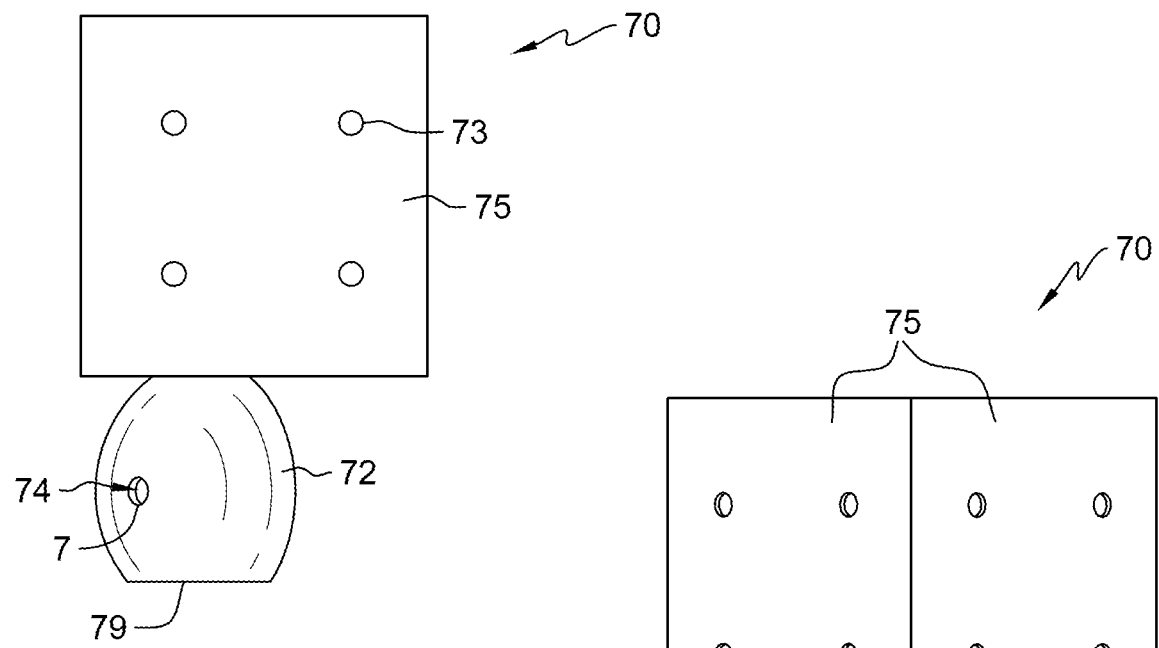
FIG. 15A is a front view of a socket adapter of the present invention.
Figure 15B:
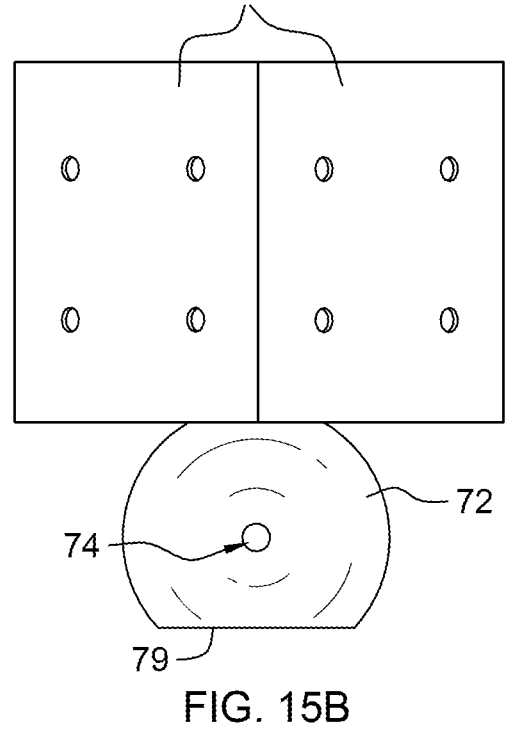
FIG. 15B is a side view of the socket adapter of FIG. 15A showing the outside corner.
Figure 15C:
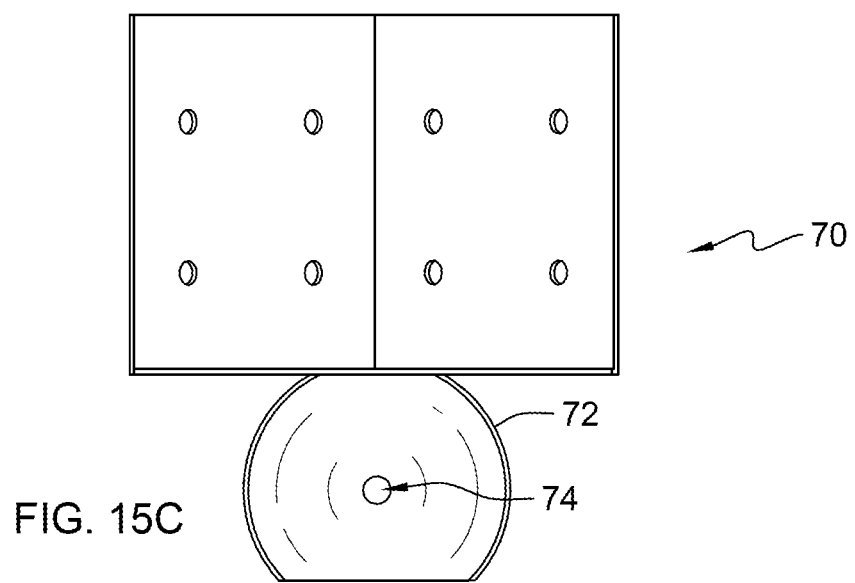
FIG. 15C is a side view of the socket adapter of FIG. 15A showing the inside corner.

With reference to FIGS. 14A and 14B, extension 42 may be a solid piece of material having a cylindrical opening 43 diametrically through the ball.

With further reference to FIGS. 6A-6D, one or more holes 45 may be provided in one or more sides 46 for receiving fasteners for fastening the ball adapter to a post. One or more holes 45 may receive a nail or a screw to fasten the ball adapter to the post. In a preferred embodiment, each of four sides 46 comprise four holes 45.

With reference to FIGS. 5 and 7A through 7C, socket adapter pair 90 may comprise socket adapter 70 and socket adapter 80 having the same size and configuration as adapter 70.

Socket adapter 70 comprises adapter body 71 for connecting the adapter to a post segment and a socket extension 72 extending longitudinally downwardly from body 71. Socket extension 72 comprises concave surface 77, convex surface 78, bottom edge 79, and lateral-facing opening 74, said concave surface defining a hollow 105 space. In a preferred embodiment, the concave surface comprises a spherical shape. The lower portion of the extension may be truncated at edge 79. Clearance between edge 79 and the ball adapter may allow for greater range of rotation of the socket around the ball such as rotation about the joint connector shaft 61.

In operative assembly in the joint, socket extension 72 of socket adapter 70 may cooperate with corresponding socket extension 82 of socket adapter 80 to receive the extension of the ball adapter to form an adjustable ball and socket joint. The convex surface of the ball adapter extension faces concave surface 77 and is disposed in the concave hollow 105 space. Edge 79 of socket adapter 70 and the corresponding edge of socket adapter 80 may be below a perimeter of a sphere so as to form an opening smaller than the perimeter.

Socket adapter body 71 may comprise sides 75 disposed at right angles to one another to form a square corner and bottom 76 disposed at right angles to sides 75 to form a three-sided square corner to conform to a square corner of an end of a rectangular post. Sides 75 and bottom 76 form a pocket for receiving and engaging a post segment. Sides 75 may comprise post interface surface 103 and bottom 76 may comprise post interface surface 104, said interface surfaces for engaging with a surface of a post segment.

One or more holes 73 may be provided in one or more sides 75 for receiving fasteners for fastening the socket adapter to a post. In a preferred embodiment, one or more holes 73 may receive a nail or a screw to fasten the socket adapter to the post. In a preferred embodiment, each of four sides 75 comprise four holes 73.

In a preferred embodiment, socket adapters 70 and 80 are configured so that socket extensions 72 and 82 may conform to the size and shape of extension 42 when the adapters are attached to a post segment so that socket adapter pair 90 and ball adapter 40 may form a functional ball and socket joint. For example, the socket adapters may be configured so that concave surfaces 77 and 87 of socket extensions 72 and 82 conform to a 3-inch diameter ball when the socket adapters are attached at opposite corners of a 4"×4" post segment.

With reference to FIGS. 8 and 12B, the adjustable joint of the present invention provides for a range rotation of the socket adapter relative to the ball adapter of up to 35° about an axis perpendicular to longitudinal axis ZZ of connector 60. Opening 43 may be substantially larger than the diameter of connector 61 so that there is substantial clearance between shaft surface 64 and the peripheral surface 4 of opening 43. With further reference to FIG. 12B connector 60 is rotated angle θY° clockwise about an axis YY (see FIG. 8) through the available clearance in opening 43. Rotation may be anywhere in the range of θY clockwise to θY counterclockwise from a centerline axis of opening 43, for a total range of rotation of twice θY°.

Figure 12A:
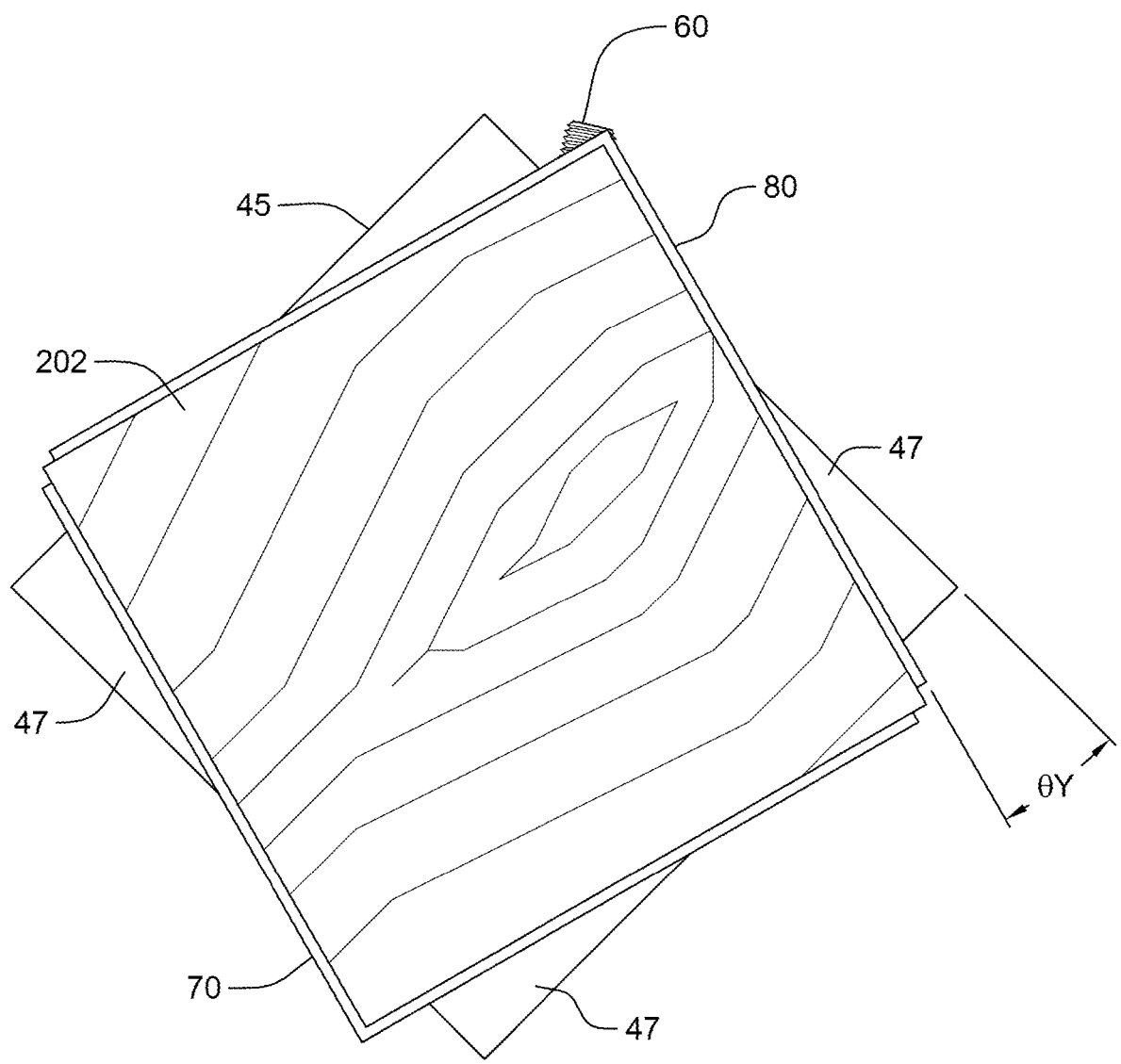
FIG. 12A is a top view of vertically aligned post segments joined by the joint, with the upper post segment twisted about a vertical axis relative to the lower post segment.
Figure 12B:
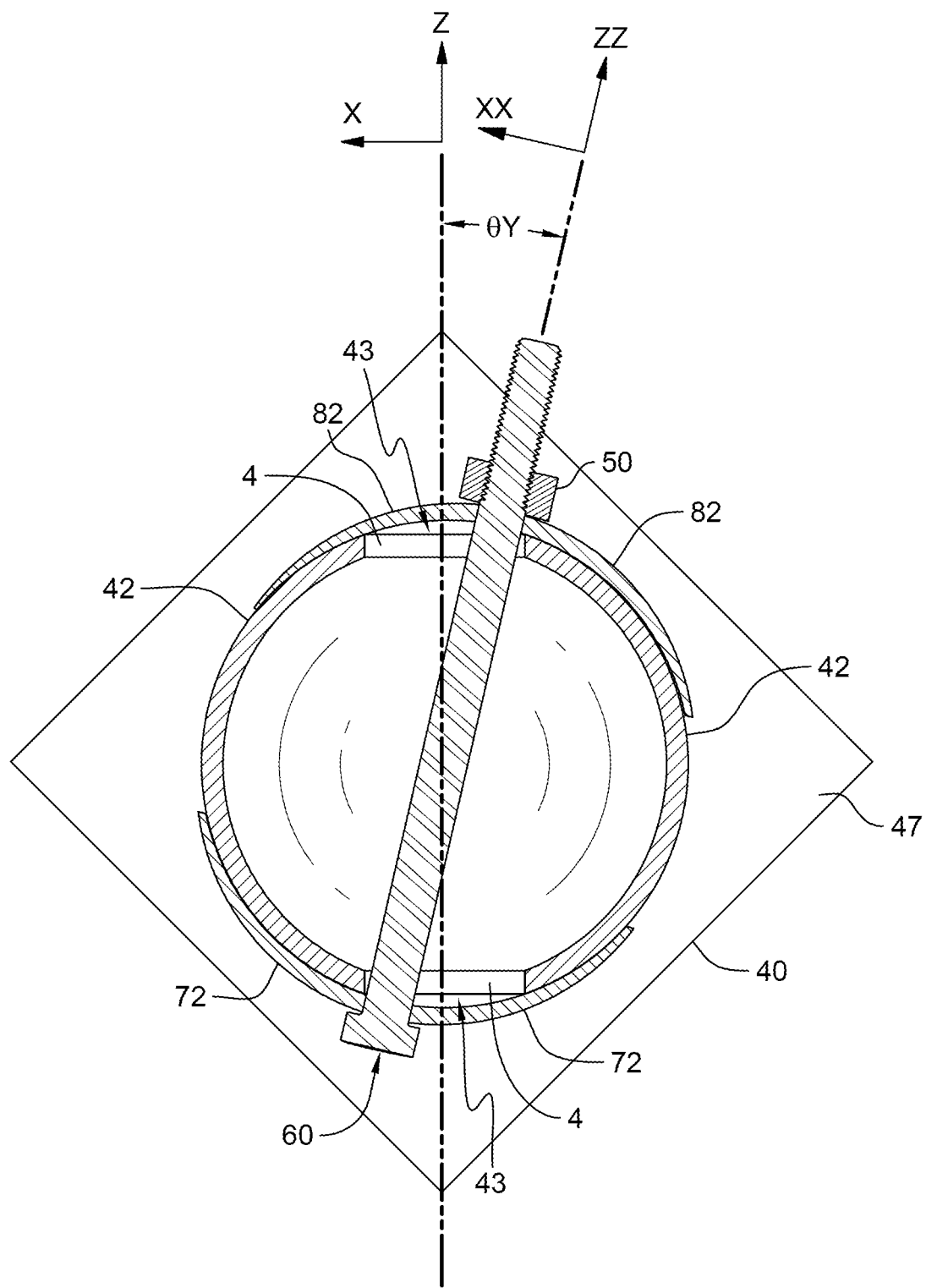
FIG. 12B is a cross sectional view of the adjustable joint of FIG. 12A sectioned in a horizontal plane through the axis of the bolt.
Figure 13A:
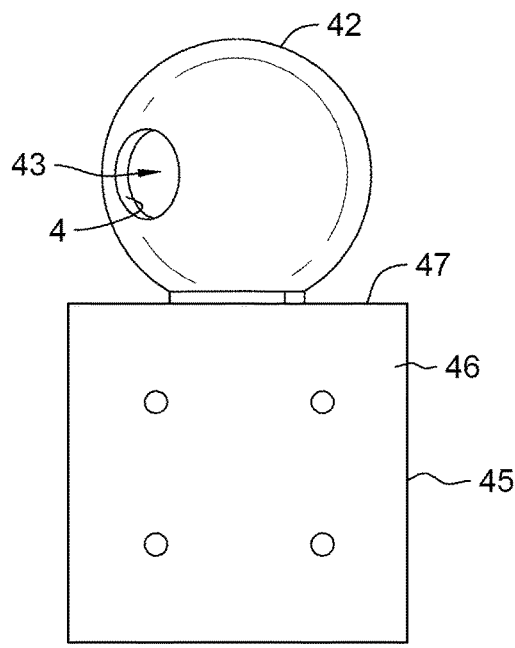
FIG. 13A is front view of a ball adapter of the present invention.
Figure 13B:
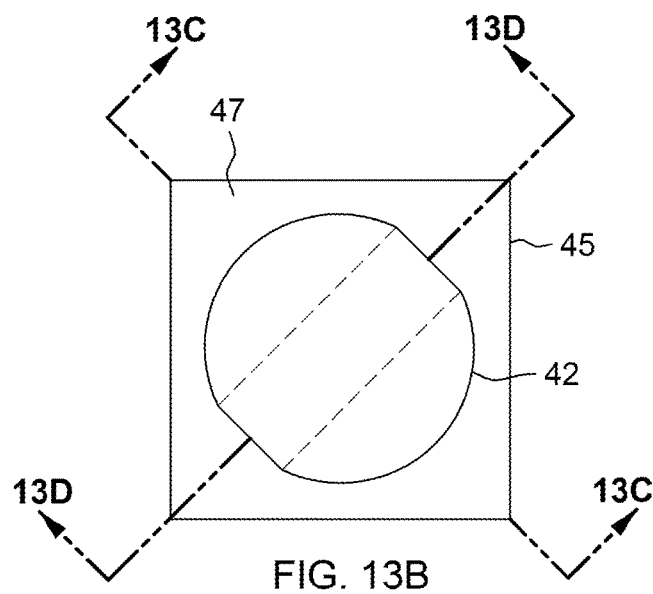
FIG. 13B is a top view of the ball adapter of FIG. 13A.
Figure 13C:
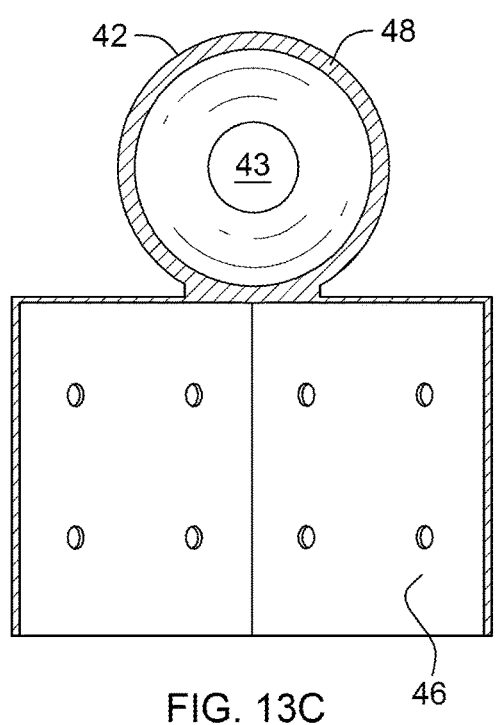
FIG. 13C is a cross-sectional view of the ball adapter of FIG. 13B along section line 13C 13C.
Figure 13D:
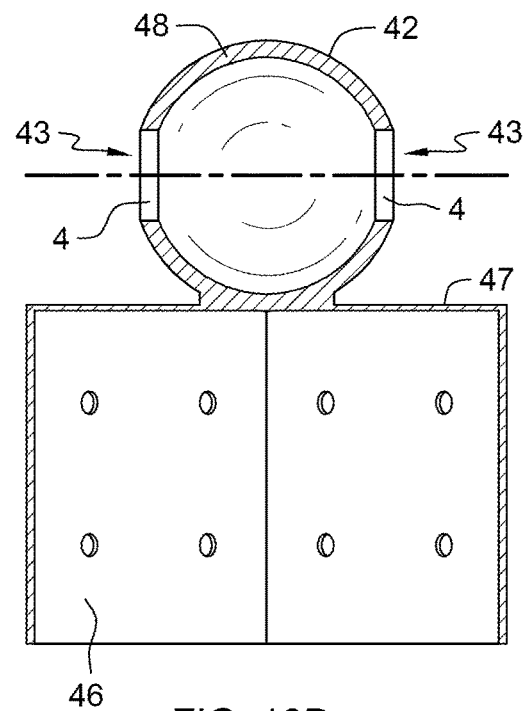
FIG. 13D is a cross-sectional view of the ball adapter of FIG. 13B along section line 13D-13D.

With reference to FIG. 12A, showing a top view of a vertical post segments joined by the adjustable joint, upper post segment 202 is twisted clockwise θY° relative to lower post segment 201 (out of view beneath ball adapter surface 47).

In a preferred embodiment, shaft 61 may have a diameter in the range 1/16"-1/8", 1/8"-3/16", 3/16"-1/4", 1/4"-5/16", 5/16"-3/8", 3/8"-7/16", 7/16"-1/2", 1/2"-9/16", 9/16"-5/8", 5/8"-11/16", 11/16"-3/4", 3/4"-13/16", 13/16"-7/8", or 7/8"-15/16".

In a preferred embodiment, extension 42 may comprise a spherical segment having a diameter of about 3" and opening 43 may have a diameter in the range 1/2"-9/16", 9/16"-5/8", 5/8"-11/16", 11/16"-3/4", 3/4"-13/16", 13/16"-7/8", 7/8"-15/16", or 15/16"-1." In a preferred embodiment, said diameter of opening 43 may be greater than the diameter of shaft 61 by an amount in the range 1/16"-1/8", 1/8"-3/16", 3/16"-1/4", 1/4"-5/16", 5/16"-3/8", 3/8"-7/16", 7/16"-1/2", 1/2"-9/16", 9/16"-5/8", 5/8"-11/16", 11/16"-3/4", 3/4"-13/16" 13/16"-7/8" or 7/8"-15/16".

In another preferred embodiment, extension 42 may have a diameter of about 3", opening 43 may have a diameter of about 1", and shaft 61 of connector 60 may have a diameter of about 3/8".

Figure 11A:
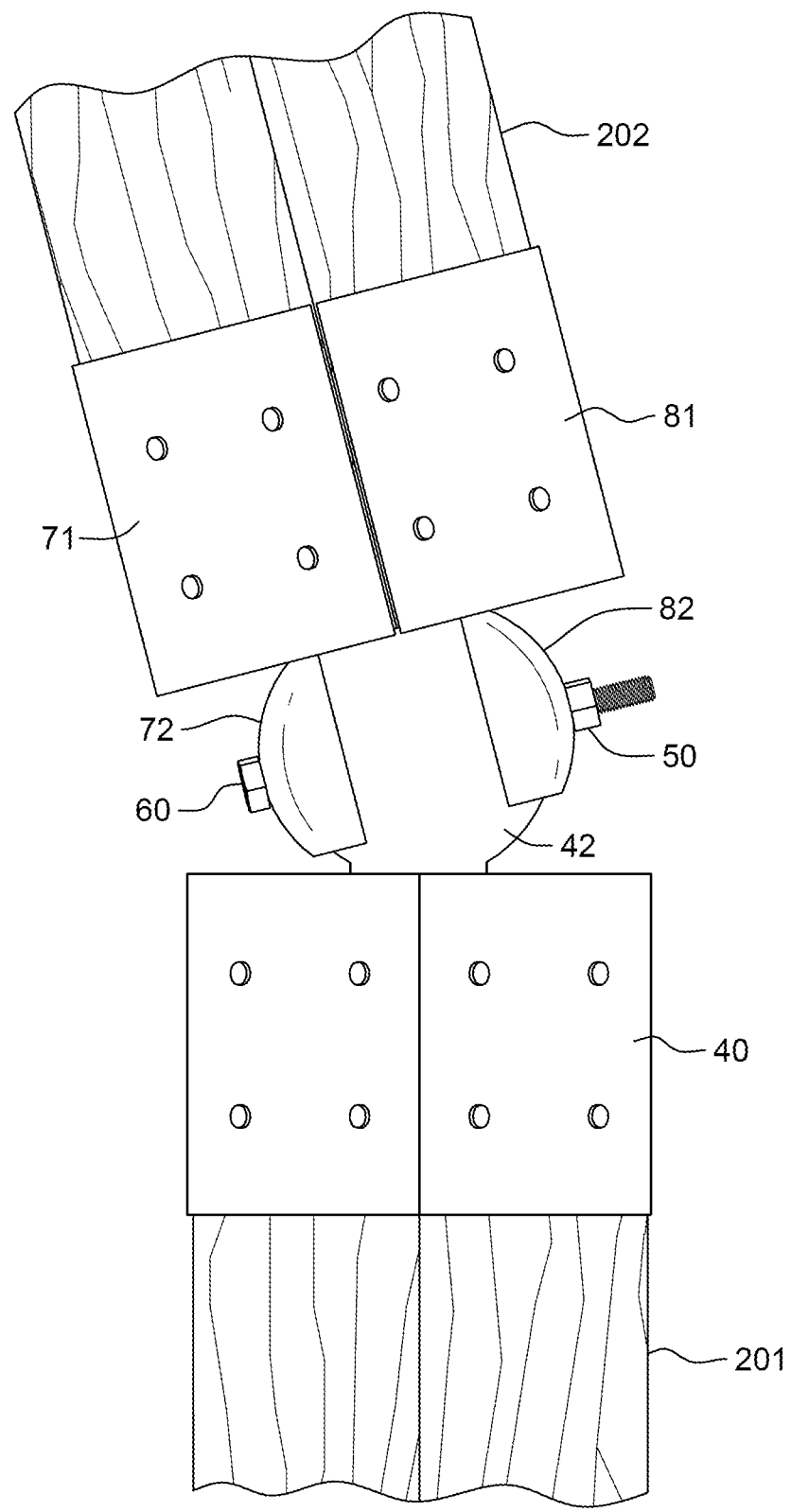
FIG. 11A is a front view of an adjustable joint of the present invention with a bolt and socket adapter tilted in a vertical plane through the bolt axis.
Figure 11B:
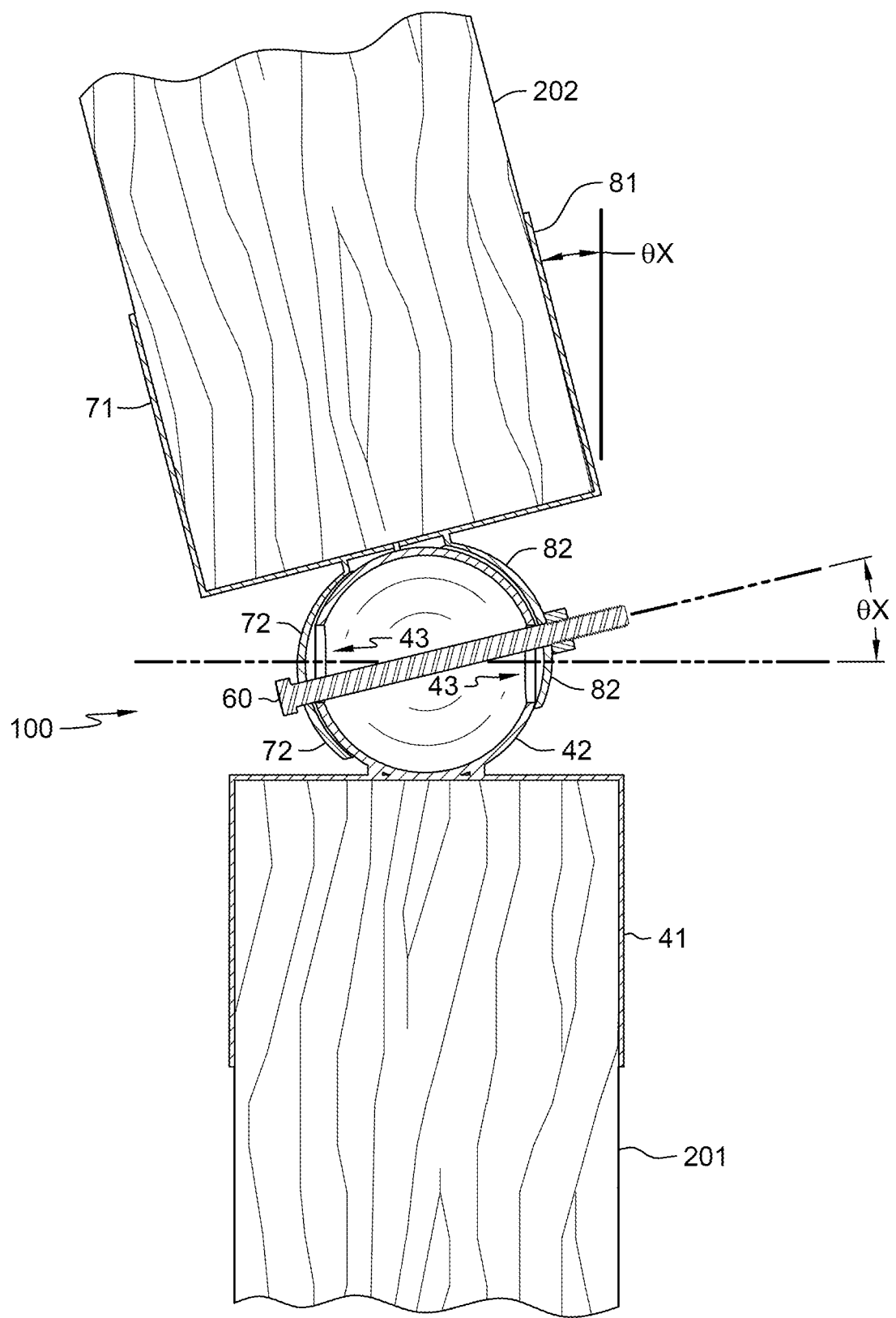
FIG. 11B is a cross sectional view of the adjustable joint of FIG. 11A sectioned in a vertical plane through the bolt axis.

With reference to FIG. 11B, joint 100 may be adjusted by rotating it θX° about a horizontal axis perpendicular longitudinal axis ZZ (FIG. 12B) of connector 60 through the allowable clearance (discussed above in reference to FIG. 12B) between shaft surface 64 (FIG. 8) and the peripheral surface 4 (FIG. 12B). Post segment 202 is oriented at a corresponding angle of θX° relative to post segment 201. The range of rotation from θY clockwise to θY counterclockwise from a centerline axis of opening 43 may be up to about 35°.

With reference to FIGS. 5, 7A-7C and 15A-15C, in a preferred embodiment, socket extension holes 74 and 84 (out of view) may be sized to closely conform to the diameter of shaft 61 so that there is little or no clearance between the shaft and periphery of said holes. With reference to FIGS. 16A and 16B, in an alternate embodiment, said socket extension holes may be oversized relative to the shaft diameter to provide for an additional range rotation of the socket adapter relative to the ball adapter. Holes 74 and 84 may be aligned on lateral axis Z' and may be substantially larger than the diameter of connector 61 so that there is substantial clearance between shaft surface 64 the peripheral surfaces 7 of hole 74 and the peripheral surface of hole 84. Providing oversized socket extension holes 74 and 84 may provide an additional range of rotation of up to 35° about an axis perpendicular to longitudinal axis ZZ of connector 60. In a preferred embodiment, holes 74 and 84 may have diameters in the range 1/2"-9/16", 9/16"-5/8", 5/8"-11/16", 11/16"-3/4", 3/4"-13/16", 13/16"-7/8", 7/8"-15/16 ", or 15/16"-1" and said diameters may be greater than the diameter of shaft 61 by an amount in the range 1/16"-1/8 ", 1/8 "-3/16", 3/16"-1/4", 1/4"-5/16", 5/16"-3/8", 3/8"-7/16", 7/16"-1/2", 1/2"-9/16", 9/16"-5/8", 5/8"-11/16", 11/16"-3/4", 3/4"-13/16", 13/16"-7/8" or 7/8"-15/16 ".

With reference to FIG. 5, in a preferred embodiment, washers 91 and 92 may be provided having inside diameter closely fitted (i.e., little to no clearance) to shaft 61 and outside diameter larger than holes 74 and 84.

The present invention further provides an improved method of repairing a leaning mailbox post, comprising the steps of: severing leaning post 200 into post segments 201 and 202, providing an adjustable ball and socket joint of the present invention for connecting the post segments together; adjustably connecting the post segments together with the joint; adjusting the joint to position the post segments in desired orientation with respect to one another; and releasably tightening the joint to releasably fix the post segments in the desired orientation.

The present invention further provides an improved method of repairing a leaning mailbox post, comprising the steps of severing leaning post 200 into post segments 201 and 202, preferably by cutting in a plane perpendicular to a longitudinal dimension of the post; providing a ball adapter 40 having a convex surface and opening 43 through the convex surface for receiving a shaft of a connector; providing a first socket adapter 70 having a concave surface and opening 74 through the concave surface for receiving a shaft of the connector, the concave surface rotatably engageable with the convex surface; providing a connector 60 having a cylindrical shaft for insertion through openings 43 and 74 so as to releasably connect the socket adapter to the ball adapter; attaching ball adapter 40 to post segment 201; attaching first socket adapter 70 to post segment 202; aligning opening 43 with opening 74 with the convex surface facing the concave surface and disposed in the concave hollow 105 space; insert connector 60 into openings 43 and 74; rotating socket adapter to a desired position in relation to the ball adapter; and releasably tightening the fastener so as to releasably fix the socket adapter in place in relation to the ball adapter, said tightening releasably pressing the concave and convex surfaces together. The method may further comprise the steps of providing a second socket adapter 70; attaching second socket adapter 70 to post segment 202 so that the concave surfaces of the first and second socket adapters face each other and cooperate to form a socket for receiving the concave surface of the ball adapter; align the opening of the second socket adapter with the opening of the first socket adapter; and inserting the connector through the opening of the second socket adapter.

The steps in the methods have no order limitation unless expressly recited or implicitly required.

In the above description of the apparatus of the present invention, a ball adapter is attached to a lower post segment and socket adapter to an upper post segment. Alternately, the ball adapter may be attached to an upper post segment and socket adapter to a lower post segment. The principals of operation of the joint are the same regardless.

In a preferred embodiment, the adjustable joint comprises two socket adapters. Alternately, the adjustable joint may comprise a single socket adapter. Either one of the socket adapters shown in the drawings may be omitted without materially altering the principles of operation of the joint.

Washers 91 and 92 are optional as long as holes 74 and 84 are too small to allow head 62 and nut 50 to pass through.

Figure 9A:
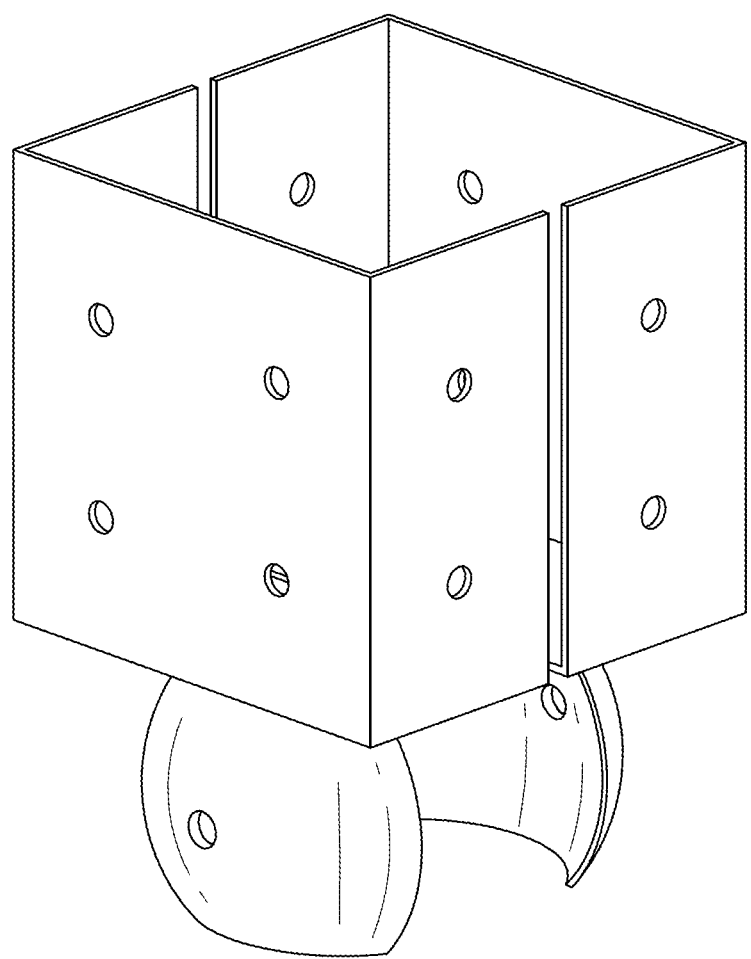
FIG. 9A is an isometric view of an alternate embodiment of the socket adapters of the present invention.
Figure 9B:
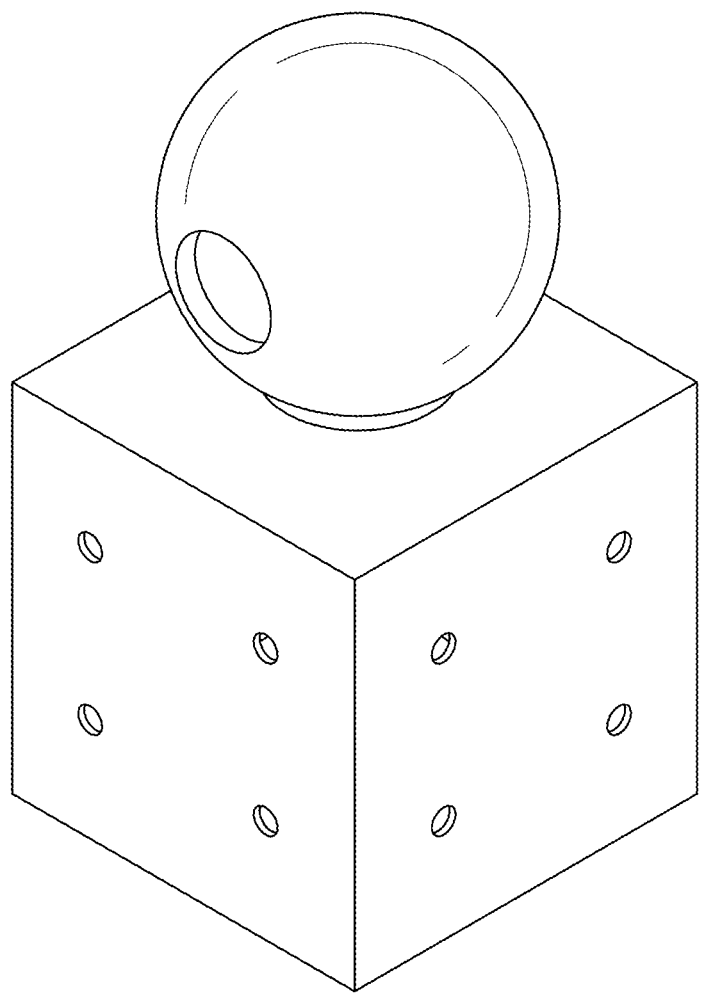
FIG. 9B is an isometric view of an alternate embodiment of the ball adapter of the present invention.
Figure 10:
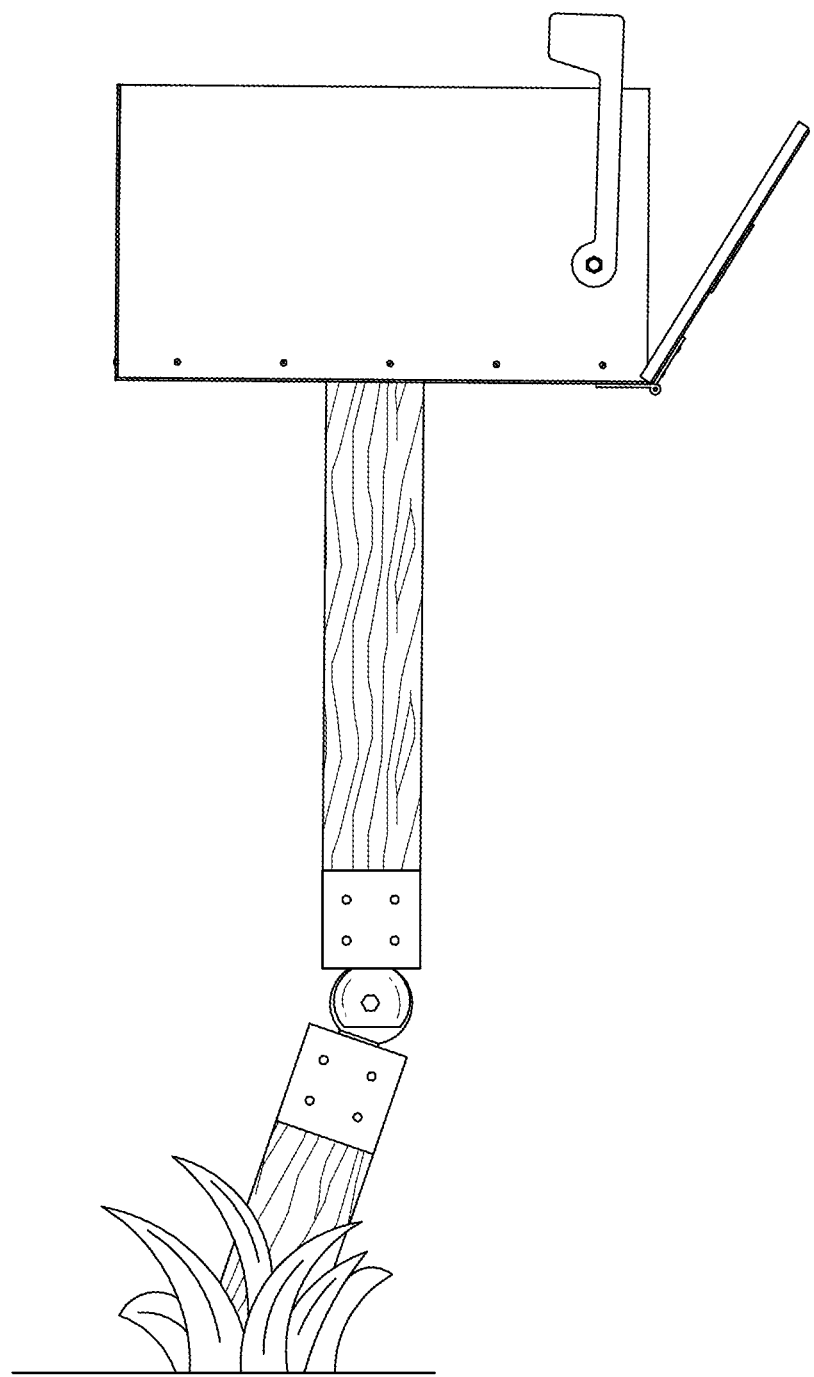
FIG. 10 is a side view of a mailbox post restored to vertical using the alternate embodiments of FIGS. 9A and 9B.

With reference to FIG. 5, in a preferred embodiment the joint of the present invention may comprise socket adapters and ball adapters configured to receive a connector member oriented diagonally to the sides of the post segments. With reference to FIGS. 9A and 9B, in an alternate embodiment the joint may comprise socket adapters and ball adapters configured to receive a connector member oriented parallel to sides of the post segments.

While the invention has been particularly shown and described with reference to certain embodiments, it will be understood by those skilled in the art that various changes in form and details may be made to the invention without departing from the spirit and scope of the invention as described in the following claims.

We claim:

1. An adjustable mailbox post joint comprising:
a connector member comprising a shaft having a shaft axis and shaft surface;
a first post adapter having a first body comprising a first interface surface for aligning a first extension in a longitudinal direction from the end of a first post segment;
said first extension extending longitudinally from said first body, said first extension comprising a convex surface;
a second post adapter having a second body comprising a second interface surface for aligning a second extension in a longitudinal direction from the end of a second post segment;
said second extension extending longitudinally from said second body, said second extension comprising a concave surface;
a first peripheral surface defining a first lateral-facing opening through said convex surface for receiving said connecting member;
a second peripheral surface defining a second lateral-facing opening through said concave surface for receiving said connecting member;
said connector member disposed through the first and second openings so that said peripheral surfaces and shaft surface provide mechanical constraint to prevent said first post adapter from longitudinal separation from said second post adapter;
said first post adapter and second post adapter connected rotatably about the shaft axis with the concave surface facing the convex surface.

2. The adjustable mailbox post joint of claim 1, wherein:
the convex surface comprises a first spherical segment; and
the concave surface comprises a second spherical segment.

3. The adjustable mailbox post joint of claim 1, wherein the connector member comprises a threaded fastener.

4. The adjustable mailbox post joint of claim 3, further comprising:
a threaded nut for threading onto the threaded fastener to releasably tighten the first post adapter and second post adapter together in fixed position.

5. The adjustable mailbox post joint of claim 4, wherein the threaded fastener comprises a bolt.

6. The adjustable mailbox post joint of claim 1, further comprising:
sufficient clearance between the connector shaft surface and first peripheral surface so that the first adapter may be rotatable at least 5° of rotation about an axis that is perpendicular to said shaft axis.

7. A mailbox post comprising:
a first post segment extending a length in a first longitudinal direction;
a second post segment connected to the first post segment by an adjustable joint and extending a length in a second longitudinal direction;
the adjustable joint comprising a convex surface, a concave surface slidably engageable with said convex surface, a first lateral-facing opening through said convex surface for receiving a connecting member, a second lateral-facing opening through said concave surface for receiving the connecting member; and
the connector member comprising a shaft disposed through the first and second openings transversely to the first longitudinal direction;
said convex surface and concave surface connected rotatably about the connector member with the concave surface facing the convex surface; and
the second longitudinal direction adjustable by rotating the second post segment relative to the first post segment about an axis of the connector member.

8. An adjustable mailbox post joint kit comprising:
a first post adapter having a first body comprising a first interface surface for aligning a first extension in a longitudinal direction from the end of a first post segment;
said first extension extending longitudinally from said first body, said first extension comprising a convex surface and a lateral-facing opening through said convex surface;
a second post adapter having a second body comprising a second interface surface for aligning a second extension in a longitudinal direction from the end of a second post segment;
said second extension extending longitudinally from said second body, said second extension comprising a concave surface and a lateral-facing opening through said concave surface;
said concave surface forming a hollow for receiving the convex surface; and
a connector member comprising a shaft for insertion through the first and second openings to connect said first post adapter and second post adapter rotatably about the connector member shaft.

9. A method of repairing a leaning post, comprising the steps of:
severing the post transversely to a longitudinal axis into a first post segment and second post segment;
providing a first post adapter comprising a longitudinally extending first extension having a convex surface and a first lateral-facing opening through said convex surface;
attaching the first post adapter to the first post segment so that said first lateral-facing opening faces laterally;
providing a second post adapter comprising a longitudinally extending second extension having a concave surface and a second lateral-facing opening through said concave surface;
attaching the second post adapter to the second post segment so that said second lateral-facing opening faces laterally;
aligning the first and second lateral-facing openings so that the concave surface faces the convex surface;
inserting a connector member comprising a shaft through the first and second lateral-facing openings so as to connect the first and second post adapters together rotatably about an axis of the shaft;
rotating the second post adapter to a desired position in relation to the first post adapter; and
releasably tightening a fastener to releasably fix the first post adapter in place in relation to the second post adapter.

* * * * *